US005709175A

United States Patent [19]

Carroll

[11] Patent Number: 5,709,175

[45] Date of Patent: Jan. 20, 1998

[54] COOLING AIR SYSTEM FOR AN ENGINE

[75] Inventor: Jim K. Carroll, Peoria, Ill.

[73] Assignee: Caterpillar Inc., Peoria, Ill.

[21] Appl. No.: 574,849

[22] Filed: Dec. 19, 1995

[51] Int. Cl.[6] ........ B60K 11/04

[52] U.S. Cl. ........ 123/41.49; 123/41.66

[58] Field of Search ........ 123/41.48, 41.49, 123/41.57, 41.58, 41.65, 41.66, 41.7

[56] References Cited

U.S. PATENT DOCUMENTS

| | | | |
|---|---|---|---|
| 3,043,390 | 7/1962 | Lattay | 180/54 |
| 3,794,001 | 2/1974 | Birche et al. | 123/41.58 |
| 3,937,189 | 2/1976 | Beck | 123/41.49 |
| 3,937,192 | 2/1976 | Longhouse | 123/41.66 |
| 3,978,919 | 9/1976 | Fachbach et al. | 165/135 |
| 3,978,938 | 9/1976 | Joscher et al. | 180/68 |
| 3,980,132 | 9/1976 | Mitchell et al. | 123/41.49 |
| 3,989,415 | 11/1976 | Van-Hee et al. | 417/312 |
| 4,071,009 | 1/1978 | Kraina | 123/198 E |
| 4,086,976 | 5/1978 | Holm et al. | 123/41.49 |
| 4,136,735 | 1/1979 | Beck et al. | 165/125 |
| 4,173,995 | 11/1979 | Beck | 165/51 |
| 4,180,130 | 12/1979 | Beck et al. | 123/41.66 |
| 4,181,172 | 1/1980 | Longhouse | 123/41.49 |
| 4,339,014 | 7/1982 | Berth et al. | 180/54 |
| 4,371,047 | 2/1983 | Hale et al. | 123/41.7 |
| 4,396,351 | 8/1983 | Hayashi et al. | 123/41.49 |
| 4,398,508 | 8/1983 | Moon et al. | 123/41.49 |
| 4,566,852 | 1/1986 | Hauser | 415/182 |
| 4,608,946 | 9/1986 | Tanaka et al. | 123/41.65 |
| 4,733,750 | 3/1988 | Piorier et al. | 181/202 |
| 4,854,278 | 8/1989 | Honecker | 123/198 E |
| 4,883,024 | 11/1989 | Ito et al. | 123/41.7 |
| 4,917,201 | 4/1990 | Fujikawa et al. | 123/41.57 |
| 4,917,572 | 4/1990 | Van Houten | 415/206 |
| 4,998,510 | 3/1991 | Rognon | 123/41.7 |
| 5,180,003 | 1/1993 | Kouzel et al. | 123/41.49 |
| 5,542,380 | 8/1996 | Chatten | 123/41.65 |

*Primary Examiner*—David A. Okonsky
*Attorney, Agent, or Firm*—Alan J. Hickman

[57] ABSTRACT

A cooling air system for an internal combustion engine has an engine enclosure and a plenum connected to the engine enclosure. A radial flow fan disposed in the plenum has blades which are spaced from the side wall a preselected distance. An inlet duct in the engine enclosure directs drawn outside ambient air toward a radiator located within the engine enclosure. A shroud extending into the plenum directs air flow passing through the radiator axially toward the radial flow fan. An outlet opening at the top end of the plenum exhausts radially directed heated air flow elevationally to the atmosphere.

15 Claims, 1 Drawing Sheet

COOLING AIR SYSTEM FOR AN ENGINE

TECHNICAL FIELD

This invention relates to a cooling air system for an internal combustion engine and more particularly to a ducted sound suppressing cooling air system having a radial flow fan.

BACKGROUND ART

Internal combustion engines and associated cooling air systems tend to be relatively noisy. Governmental bodies in many countries are continuously striving to require engine and vehicle manufacturers to reduce the noise output of their products. The manufactures themselves also desire to reduce the noise level in order to provide operators and by-bystanders with a more comfortable atmosphere.

In such endeavor, a multiplicity of schemes and constructions have been tried, some of which make significant progress in noise reduction. It is also understood in the industry that the variables in noise reduction are many and exist in many combinations. Therefore, seemingly insignificant modifications in air flow systems sometimes represent dramatic improvements in noise reduction.

Noise reduction of engine cooling air systems has been achieved in some instances by insulating the area in relatively close proximity to the fan with a sound absorbing material. This approach achieves a reduction in the noise level of the cooling air system, however, the insulation tends to retain heat which reduces the efficiency of the cooling system associated with the internal combustion engine.

Vehicle engine noise can be effectively attenuated by ducted enclosures which provide limited air flow access via controlled, indirect, acoustically lined paths (ducts). However, with current axial flow cooling systems, increased air restriction requires higher fan speeds to deliver adequate cooling air flow. Higher fan speeds generate higher fan noise which results in an unacceptably loud vehicle.

Other prior attempts to reduce the noise level of a cooling air flow system have been related to axial fan geometry, including blade and shroud design. These attempts have only been marginally successful as they have not reduced the amount of noise emitted to a target sound level.

Radial flow fans have been primarily used in ventilation and heating systems. Such fans are considered efficient but tend to be noisy and not acceptable for engine cooling air flow applications. Use of radial flow fans in automotive applications where ram air is the primary source of cooling air flow has been rejected. Use of radial flow fans for use in other engine or machine applications has not been considered appropriate.

The present invention is directed to overcome one or more of the problems as set forth above.

DISCLOSURE OF THE INVENTION

In one aspect of the present invention, a cooling air system for an internal combustion engine includes a radial fan having a plurality of radially extending blades defining an outer diameter "d" and a plenum having a bottom wall, opposed side walls, and a width "w" as measured between the side walls. The plenum has a generally rectangular configuration and is positioned about said fan blades at a location at which each of the opposed plenum side walls is respectively spaced from the fan blades outer diameter a magnitude in the range of between 0.09 to 0.14 of the plenum width "w".

In another aspect of the present invention, a cooling air system for an internal combustion engine having a radiator is provided. The cooling air system has a radial fan. The radial fan has a plurality of radially extending blades defining an outer diameter. A plenum having a bottom wall, opposed side walls, a front wall and top end is positioned about the fan blades at a location at which each of the opposed plenum side walls is respectively spaced from the fan blades outer diameter a preselected distance. The plenum has a generally rectangular configuration and the fan has an axis of rotation. The axis of rotation is oriented transverse to the plenum front wall. An engine enclosure having spaced apart opposed side walls, a top wall, a bottom wall, and a front wall. The front wall has an opening. The engine enclosure has a generally rectangular configuration and is connected at the engine enclosure front wall to the plenum. The engine and radiator are disposed in the enclosure. The radiator is located between the engine and the plenum. The plenum front wall is spaced from the engine enclosure front wall and the radial fan is disposed between the engine enclosure and plenum front walls. An inlet duct is connected to the engine enclosure and opens at the engine enclosure top wall. The plenum has an outlet opening at the top end. The inlet duct defines a passageway which is oriented to direct ambient cooling air flow toward the radiator. The outlet opening is oriented to pass convection heated air flow elevationally from the plenum. A shroud having a rectangular box like configuration and an arcuate shaped shroud flange is coaxially disposed about the radial fan axis. The arcuate shaped shroud flange defines an opening. The shroud is connected to the radiator and the arcuate shaped shroud flange is disposed in the engine compartment front wall opening. The radial fan has an arcuate shaped fan flange coaxially disposed about the radial fan axis. The arcuate shaped fan flange overlaps the arcuate shaped shroud flange. The shroud directs cooling air flow drawn by the radial fan from the inlet passage through the radiator and to the radial fan. The outlet opening directs convection heated air flow elevationally from the plenum.

The ability to reduce noise and provide adequate cooling air flow is achieved by the arrangement and construction of components of the cooling air flow system discussed herein.

BEST MODE FOR CARRYING OUT THE INVENTION

Figure 1:
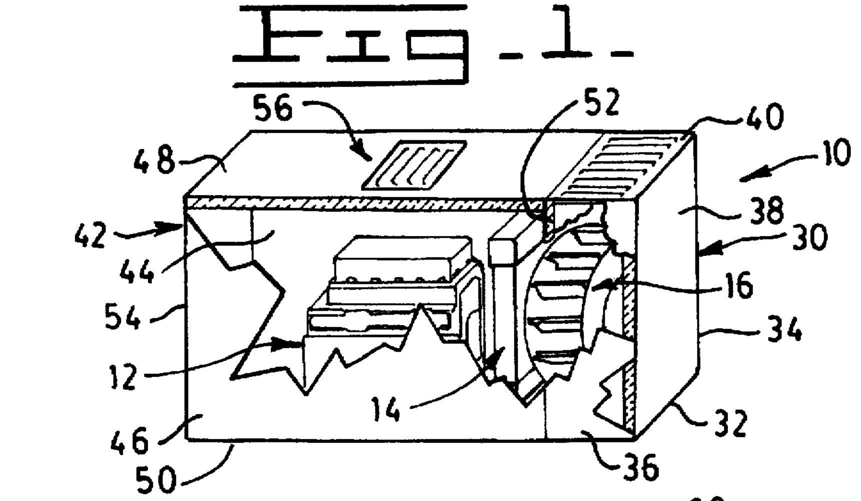
FIG. 1 is a diagrammatic isometric view of an embodiment of the cooling air flow system of the present invention with portions broken away.
Figure 2:
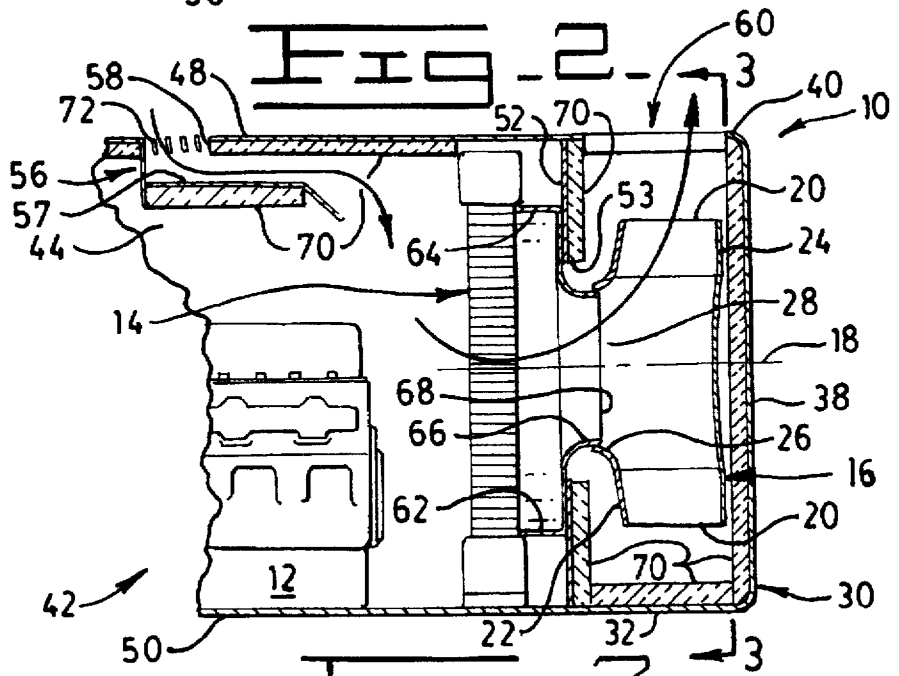
FIG. 2 is a diagrammatic crossectional view of the cooling air flow system of FIG. 1 showing further system details.
Figure 3:
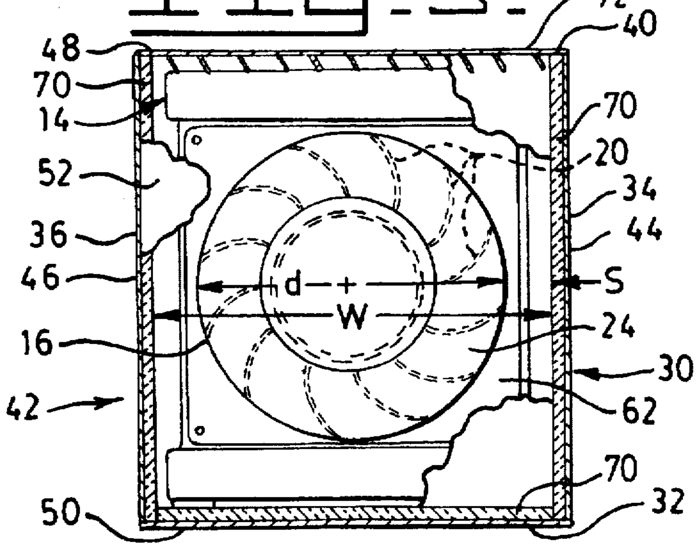
FIG. 3 is a diagrammatic crossectional view taken along lines 3—3 of FIG. 2, with portions broken away, showing yet another view of the cooling air flow system.

A cooling air system 10 for convection cooling of an internal combustion engine 12 having an associated radiator 14, is shown in FIGS. 1,2, and 3. The cooling air system 10 is particularly suitable for use in machine applications, such as earthworking, paving, and the like. However, other applications in which ram air is not suitable as a source of cooling air flow are within the scope of the invention.

The cooling air system 10 has a radial flow fan 16 with an axis of rotation 18 and a plurality of radially extending blades 20 defining an outer diameter "d". The blades 20 are substantially equally spaced apart. Preferably, the radially extending blades 20 are backwardly-curved and the radial flow fan 16 is a plug fan. The radial flow fan 16 has a first flange 22 and a second flange 24. The first and second flanges 22,24 are axially spaced apart relative to the fan axis 18 and the radially extending blades 20 are connected to the first and second flanges 22,24. The first flange 22 has an arcuate shaped fan flange portion 26 substantially coaxially disposed about and axially extending along the fan axis 18. The arcuate flange portion 26 defines a circular opening 28 coaxial about the fan axis 18 to allow inlet air to enter the fan geometry. The radial flow fan 16 is rotatively driven by a hydraulic or an electric motor or by a mechanical drive system associated with the internal combustion engine 12, all not shown. Such drives are well known in the art and will not be discussed in any greater detail.

The cooling air system 10 includes a plenum 30 having a bottom wall 32, opposed side walls 34,36, a front wall 38, and a top end 40. The plenum 30 houses the radial flow fan 16. The opposed side walls 34,36 of the plenum 30 are spaced a preselected distance "w" apart, as measured between the side walls 34,36. The plenum 30 has a generally rectangular configuration and is positioned about the fan blades 20 at a location at which each of the opposed plenum side walls 34,36 is respectively spaced from the fan blades outer diameter "d" a preselected distance "s" It is to be noted that the side walls 34,36 may be lined with a sound absorbing material 70. In such cases, side walls 34,36 include the sound absorbing material 70, and the distance "s" is measured from the closest of the sound absorbing material 70 or side walls 34,36. In particular, as best seen in FIG. 3, each of the plenum side walls 34,36 is respectively spaced from the fan blades maximum diameter "d" a magnitude in the range of about 0.09 to about 0.14 of the plenum width "w". The axis 18 of rotation of the fan 16 is oriented transverse to the plenum front wall 38.

The cooling air system 10, includes an engine enclosure 42 having spaced apart opposed side walls 44,46, a top wall 48, a bottom wall 50, a front wall 52 having an opening 53 disposed therethrough and a rear wall 54. The engine enclosure 42 has a generally rectangular configuration and is connected at the engine enclosure front wall 52 to the plenum 30. The engine enclosure front wall seals the plenum 30 from the engine enclosure 42. Air flow from the engine enclosure 42 passes through the opening 53 in the front wall 52. The engine 12 and radiator 14 are disposed in and connected to the engine enclosure 42. The radiator 14 is located between the engine 12 and the plenum 30. The front wall opening 53 is adapted to pass cooling air flow from the engine enclosure 42 to the plenum 30. The plenum front wall 38 is spaced from the engine enclosure front wall 52. The fan 16 is disposed between the engine enclosure and plenum front walls 52,38. An inlet duct 56 is connected to the engine enclosure 42 top wall 48 and has an inlet opening 58 disposed in the top wall 48. An outlet opening 60 is located at the top end 40 of the plenum 30. The inlet duct 56 defines a passageway 57 for cooling air flow to pass. The passageway 57 of the inlet duct 56 is oriented to direct ambient cooling air flow toward the radiator 14, and the outlet opening 60 is oriented to pass convection heated air flow elevationally from the plenum 30 to the atmosphere.

A shroud 62, has a rectangular shaped box like portion 64 and an arcuate shaped shroud flange portion 66 which is substantially coaxially disposed about the radial fan axis 18. The arcuate shaped shroud flange portion 66 defines an circular opening 68. The shroud 62 is connected to the radiator 14 and the arcuate shaped shroud flange portion 66 is disposed in the front wall opening 53 of the engine enclosure 42. The arcuate shaped fan flange portion 26 overlaps the arcuate shaped shroud flange portion 66 and is in close proximity to the arcuate shaped shroud flange portion 66 for smooth airflow directing and sealing purposes. As shown by the arrows in FIG. 2, the shroud 62 directs cooling air flow drawn by the radial flow fan 16 from the inlet opening 58, through the passageway 57 defined by the inlet duct 56, through the radiator 14, and through the shroud and radial fan openings 68,28. The convection heated air flow axially enters the radial fan 16, radially exits the radial fan 16, and elevationally exits the outlet opening 60 of the plenum 30 at the top end 40.

The plenum bottom wall 32, opposed side walls 34,36, and the plenum and engine enclosure front walls 38,52 are each lined with a sound absorbing material 70 of any suitable commercially available type. The inlet duct defining the cooling air flow inlet passageway 57 is also lined with sound absorbing material 70.

The inlet and outlet openings 58,60 each have a grill 72 covering the openings 58,60. The grills 72 have spaced apart bars. This allows air flow to pass and prevents undesirable objects from entering the engine enclosure 42 and the plenum 30. Such objects being of the type capable of causing damage to the radial fan 16 and other components of the cooling air system 10.

Industrial Applicability

With reference to the drawings, the cooling air system 10, provides quiet, efficient, and effective cooling of the internal combustion engine 12 while keeping the overall size of the cooling air system 10 to a minimum.

The radial flow fan 16 induces ambient cooling air to be drawn through the inlet opening 58 and into the engine enclosure 42. The inlet duct 56 is so positioned that the passageway 57 defined thereby directs the cooling air flow toward the radiator 14, positioned in the engine enclosure 42 between the engine and the front wall 38 of the engine enclosure. This cooling air flow is drawn through the radiator 14 by the radial fan 16. As well known by those skilled in the art, heat transfer takes place between the radiator 14 the cooling air flow. Since the engine enclosure 42 is separated from the plenum 30 by the front wall 38, the convection heated air must pass through the opening 53.

In particular, the shroud 62 forces the cooling air flow to be drawn through the radiator and into the plenum 30. The arcuate shapes of the shroud and radial fan flange portions 66,26 and the overlapping relationship thereof contribute to stable air flow and reduce leakage. Thus, the majority of air passed by the radial fan 16 comes from the engine enclosure 42 which increases the efficiency of operation of the cooling air system 10.

The convection heated cooling air flow enters the radial fan 16 axially and exits the fan 16 radially. The type of radial fan 16 selected for use in the application contributes to the efficiency and the magnitude of sound reduction of the cooling air system. In particular, the backward-curved, radial-flow, plug fan offers a significant improvement in these regards and eliminates the requirement for a large scroll to utilize swirl energy.

The convection heated cooling air flow forced radially outwardly by the radial flow fan 16 enters the plenum 30 and exits the plenum 30 at the outlet opening 60 elevationally to the atmosphere and away from spectators. The inlet duct 56 and plenum 30 being acoustically lined with sound absorbing material 70 further reduces the spectator sound level.

It has been discovered that the cooling air system 10 of this invention, in the environment as set forth above, reduces noise by over 15 db(A). Spacings of the plenum walls a distance less than 9% of the plenum width "w" caused an increase in the magnitude of the noise level and decreased the performance of the radial flow fan 16. Spacings of the plenum walls at distances greater than 14% of the plenum width "w" consumed precious engine space, added weight to the system, increased the size of the structure and represented a waste of labor, time, materials and natural resources.

Other aspects, objects and advantages of this invention can be obtained from a study of the drawings, the disclosure and the appended claims.

I claim:

1. A cooling air system for an internal combustion system having a radiator, comprising:

a radial fan having an axis of rotation, first and second flanges axially spaced apart relative to the axis of rotation and a plurality of radially extending blades defining an outer diameter "d" and being disposed between the first and second flanges; and a plenum having a bottom wall, opposed side walls and a width "w" as measured between the side walls, said plenum being of a generally rectangular configuration and being positioned about said fan blades at a location at which each of said opposed plenum side walls is respectively spaced from the fan blades outer diameter a magnitude in the range of between 0.09 to 0.14 of the plenum width "w".

2. A cooling air system, as set forth in claim 1, wherein the radial fan is a backwardly-curved radial-flow type fan.

3. A cooling air system for an internal combustion system having a radiator, comprising:

a radial fan having an axis of rotation, and a plurality of radially extending blades defining an outer diameter "d";

a plenum having a bottom wall, opposed side walls and a width "w" as measured between the side walls, said plenum being of a generally rectangular configuration and being positioned about said fan blades at a location at which each of said opposed plenum side walls is respectively spaced from the fan blades outer diameter a magnitude in the range of between 0.09 to 0.14 of the plenum width "w";

an engine enclosure having spaced apart opposed side walls, a top wall, a bottom wall, and a front wall having an opening therethrough, said engine enclosure having a generally rectangular configuration and being connected to the plenum, said engine and radiator being disposed in the enclosure with the radiator located between the engine and the plenum, said front wall opening being adapted to pass cooling air flow from the engine enclosure to the plenum;

an inlet duct connected to said engine enclosure and opening at the top wall of said engine enclosure, said plenum having a top end and an outlet opening at the top end of said plenum, cooling air flow being passed from the inlet duct to the outlet opening by way of the radial fan.

4. A cooling air system, as set forth in claim 3, wherein said inlet duct defines a passageway, said passageway being oriented to pass ambient cooling air flow toward the radiator and said outlet opening being oriented to elevationally pass convection heated air flow to the atmosphere.

5. A cooling air system, as set forth in claim 4, wherein said plenum having a front wall spaced from the engine enclosure front wall, said radial fan being disposed between said engine enclosure and plenum front walls, said plenum bottom wall, said plenum opposed side walls, and said plenum and engine enclosure front walls each being lined with a sound absorbing material.

6. A cooling air system, as set forth in claim 5, wherein the inlet duct being lined with a sound absorbing material.

7. A cooling air system, as set forth in claim 6, including a shroud having a rectangular box like configuration and an arcuate shaped shroud flange portion substantially coaxially disposed about the radial fan axis, said arcuate shaped shroud flange portion defining an opening to pass air flow therethrough, said shroud being connected to the radiator and said arcuate shaped shroud flange portion being disposed in the engine enclosure front wall opening, said shroud directing air flow passing through the radiator to axially enter the radial fan.

8. A cooling air system, as set forth in claim 7, wherein said radial fan has an arcuate shaped fan flange portion disposed about the radial fan axis, said arcuate shaped fan flange portion defining a circular opening substantially concentrically disposed about the radial fan axis, said arcuate shaped fan flange portion overlapping said arcuate shaped shroud flange portion.

9. A cooling air system, as set forth in claim 3, including a shroud having a rectangular box like configuration and an arcuate shaped shroud flange portion disposed about the radial fan axis, said arcuate shaped shroud flange portion defining a circular opening to pass air flow therethrough, said circular opening being substantially concentrically disposed about the radial fan axis, said shroud being connected to the radiator and said arcuate shaped shroud flange portion being disposed in the engine enclosure front wall opening, said shroud directing air flow passing through the radiator toward the radial fan.

10. A cooling air system, as set forth in claim 9, wherein said radial fan having an arcuate shaped fan flange portion disposed about the radial fan axis, said arcuate shaped fan flange portion defining a circular opening substantially concentrically disposed about the radial fan axis, said arcuate shaped fan flange portion overlapping said arcuate shaped shroud flange portion.

11. A cooling air system, as set forth in claim 8, wherein said radiator is connected to the engine enclosure.

12. A cooling air system for an internal combustion engine having a radiator, comprising:

a radial fan having an axis of rotation and a plurality of radially extending blades defining an outer diameter;

a plenum having a bottom wall, opposed side walls, a front wall and top end, said plenum having a generally rectangular configuration and being positioned about said fan blades at a location at which each of said opposed plenum side walls is respectively spaced from the fan blades outer diameter a preselected distance, said axis of rotation being oriented transverse to the plenum front wall;

an engine enclosure having spaced apart opposed side walls, a top wall, a bottom wall, and a front wall having an opening therethrough, said engine enclosure having a generally rectangular configuration and being connected at the engine enclosure front wall to the plenum, said engine and radiator being disposed in the enclosure with the radiator located between the engine and the plenum, said plenum front wall being spaced from the engine enclosure front wall, said radial fan being disposed between said engine enclosure and plenum front walls;

an inlet duct connected to said engine enclosure and opening at the engine enclosure top wall, said plenum having an outlet opening at the top end, said inlet duct defining a passageway, said passageway being oriented to direct ambient cooling air flow toward the radiator and said outlet opening being oriented to pass convection heated air flow elevationally from the plenum;

a shroud having a rectangular box like configuration and an arcuate shaped shroud flange portion substantially coaxially disposed about the radial fan axis, said arcuate shaped shroud flange portion defining an opening, said shroud being connected to the radiator and said arcuate shaped shroud flange portion being disposed in the engine compartment front wall opening, said radial fan having an arcuate shaped fan flange portion substantially coaxially disposed about the radial fan axis, said arcuate shaped fan flange portion overlapping said arcuate shaped shroud flange portion, said shroud directing cooling air flow drawn by the radial fan from the inlet passage through the radiator and toward the radial fan, said outlet opening directing convection heated air flow elevationally from the plenum.

13. A cooling air system, as set forth in claim 12, wherein said inlet duct passageway, said plenum bottom wall, said plenum opposed side walls, and said plenum and engine enclosure front walls each being lined with a sound absorbing material.

14. A cooling air system, as set forth in claim 12, wherein the plenum has a width "w" as measured between the side walls, said opposed plenum side walls being respectively spaced from the fan blades outer diameter a magnitude in the range of between 0.09 to 0.14 of the plenum width "w".

15. A cooling air system, as set forth in claim 12, wherein the radial fan is a backwardly-curved radial-flow type fan.

* * * * *